No. 759,129. PATENTED MAY 3, 1904.
J. H. REIGLE.
CORN HUSKING MACHINE.
APPLICATION FILED AUG. 21, 1902.
NO MODEL. 2 SHEETS—SHEET 1.
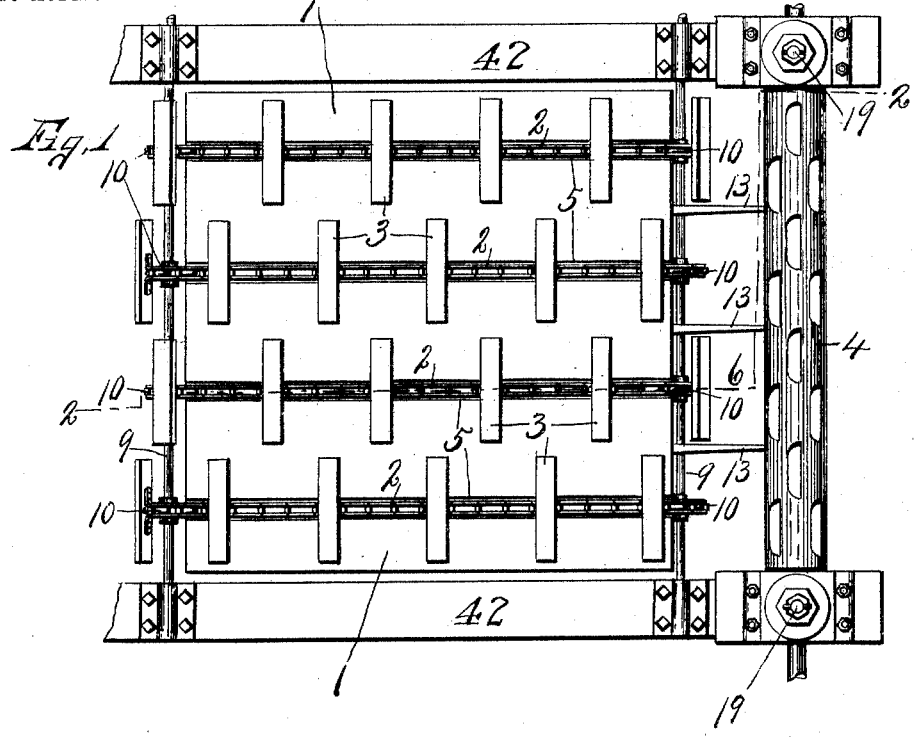
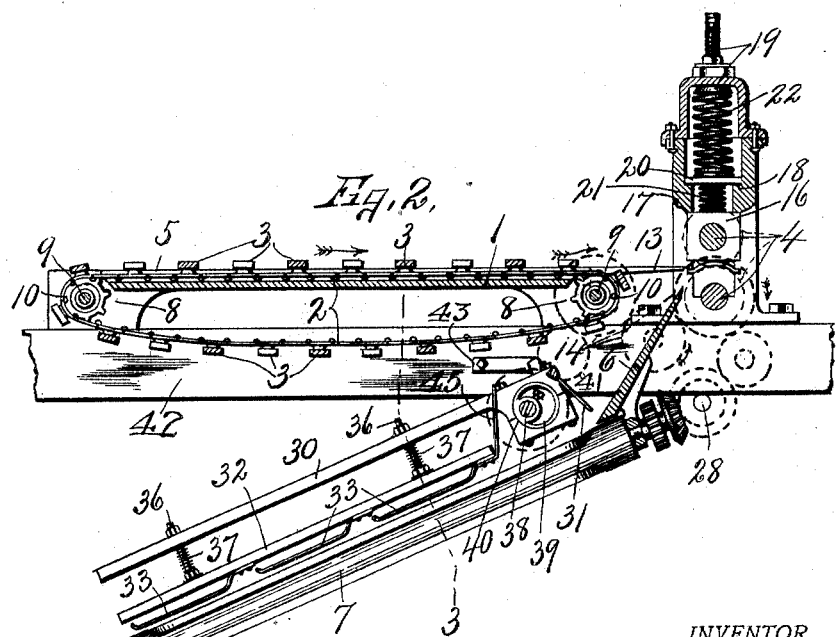
WITNESSES:
INVENTOR
John H. Reigle
BY
Smith & Dunson
ATTORNEYS.

No. 759,129. PATENTED MAY 3, 1904.
J. H. REIGLE.
CORN HUSKING MACHINE.
APPLICATION FILED AUG. 21, 1902.
NO MODEL. 2 SHEETS—SHEET 2.
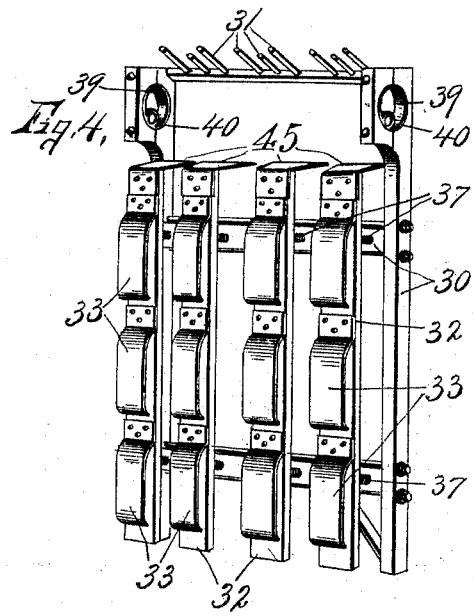
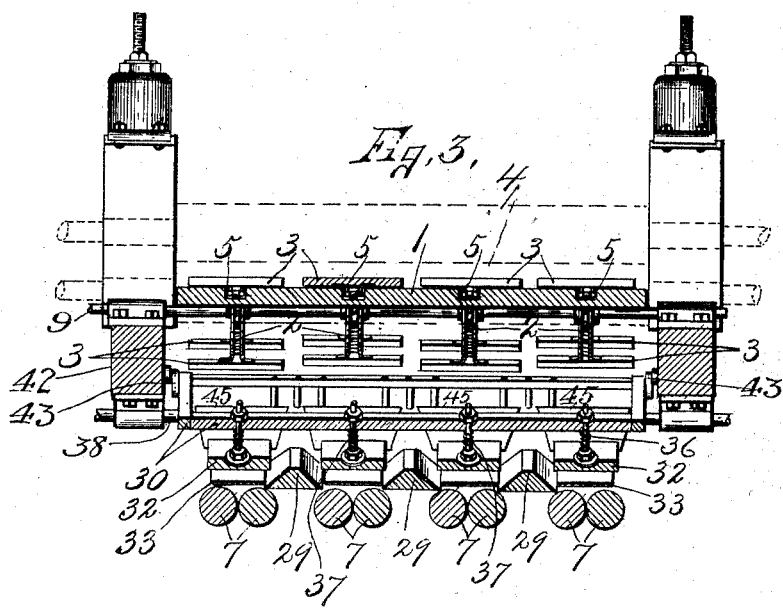
WITNESSES:
INVENTOR
John H. Reigle
BY
Smith & Dunton
ATTORNEYS.

No. 759,129. Patented May 3, 1904.

UNITED STATES PATENT OFFICE.

JOHN H. REIGLE, OF AUBURN, NEW YORK, ASSIGNOR TO THE NEW BIRDSALL COMPANY, OF AUBURN, NEW YORK, A CORPORATION OF NEW YORK.

CORN-HUSKING MACHINE.

SPECIFICATION forming part of Letters Patent No. 759,129, dated May 3, 1904.

Application filed August 21, 1902. Serial No. 120,464. (No model.)

*To all whom it may concern:*

Be it known that I, JOHN H. REIGLE, of Auburn, in the county of Cayuga, in the State of New York, have invented new and useful Improvements in Corn-Husking Machines, of which the following, taken in connection with the accompanying drawings, is a full, clear, and exact description.

My invention relates to improvements in corn-husking machines.

One of the objects of these improvements is to prevent injury to the operator in feeding the stalks to the snapping-rollers by interposing an automatic feed which carries the stalks to the said rollers and permits the operator to stand a safe distance therefrom.

Another object is to arrange the feeding mechanism so that the stalks will be automatically separated or thinned out from the bunch and fed to the stripping-rollers singly and yet continuously.

A further object is to provide for the continuous feed of the stalks across the space which necessarily intervenes between the feeding device and rollers and to prevent the clogging or accumulation of the stalks at this point.

A still further object is to provide means for drawing the ears of corn lengthwise of and upon the husking-rollers and to facilitate their successive feed against and along the rollers under a light yielding pressure.

Other objects of this improved machine are to afford a differential yielding pressure upon one of the snapping-rollers, so that the rollers will readily take in various sizes of stalks and still snap the ears of corn therefrom, and to otherwise increase its general efficiency over those now in use.

To this end the invention consists in the combination, construction, and arrangement of the parts of a corn-husking machine, as hereinafter fully described, and pointed out in the claims.

Referring to the drawings, Figure 1 is a top plan view of a portion of a corn-husking machine embodying the features of my invention, showing particularly the mechanism for feeding the stalks with the ears thereon to the snapping-rollers and also showing the fingers for bridging the stalks over the space between the feeding mechanism and snapping-rollers. Fig. 2 is a longitudinal section taken on line 2 2, Fig. 1, showing the relative arrangement of the husking-rollers to the snapping-rollers and stalk-feeding mechanism and also showing the eccentrically-movable agitator-frame interposed between the husking-rollers and feeding device, and, further, showing in section one of the vertical guides for the bearing for one end of the upper snapping-roller and the differential-pressure springs for said upper snapping-roller. Fig. 3 is a transverse vertical sectional view taken on line 3 3, Fig. 2. Fig. 4 is a perspective view of the detached agitator-frame and the parts, showing the eccentrics in the respective bearings.

Similar reference characters indicate corresponding parts in all the views.

In carrying out the first object of my invention I employ a table 1, a series of endless conveyer-chains 2, having transverse bars 3 secured thereto, and a suitable driving mechanism, hereinafter referred to, for actuating the conveyers simultaneously.

The table 1 is disposed in a substantially horizontal plane with its upper face alined with the meeting faces of snapping-rollers 4 and is provided with a series of lengthwise-parallel grooves 5, in which the upper portions of the conveyer-chains ride toward the stripping or snapping rollers 4. The forward end of the table terminates a sufficient distance from the rollers 4 to permit the ears of corn to drop freely through the space when removed by the rollers from the stalks, said ears being then conducted along an inclined chute 6 to inclined husking-rollers 7, presently described.

Mounted upon suitable supports 8 at the opposite ends of the table 1 are revoluble shafts 9, each of which is provided with a series of sprocket-wheels 10, alined with their respective grooves and arranged so that the conveyer-chains ride in their respective grooves with their upper surfaces substantially coincident with or slightly beneath the upper surface of the table. Each of these chains is provided with a series of transverse bars 3, previously mentioned, for feeding the stalks along the surface of the table to the snapping-rollers, the bars of one series being staggered with those of the adjacent series, so as to better separate or spread the stalks and feed them singly and yet continuously to the rollers 4.

The bars 3 are secured at their central portions to their respective chains, so that their opposite ends extend beyond the grooves in which the chains ride and slide along the surface of the table, the ends of the bars of adjacent series terminating short of one another, so that slight spaces exist between the lines of travel of said adjacent ends.

As previously stated, the forward end of the table terminates a sufficient distance from the snapping-rollers to permit the free discharge of the ears of corn from said rollers to the husking-rollers and in order that the stalks may be properly bridged over this space in their transit from the conveyers to the rollers 4 and to prevent clogging or accumulation of the stalks at this point I provide the table with fixed forwardly-extending fingers 13, having their front ends alined with and in close proximity to the meeting faces of the snapping-rollers and separated from each other a sufficient distance to permit the removed ears of corn to readily drop between the fingers upon the inclined wall or chute 6, by which they are then conducted to the husking-rollers. These fingers project forwardly from the front edge of the table 1 at points substantially midway between the grooves 5, and therefore necessitate the termination of the contiguous ends of the bars 3 of adjacent series short of one another, so as to leave a space between the lines of travel of said contiguous ends in alinement with the fingers 13, which permits the bars to pass freely between the fingers.

The conveyers are arranged to move in synchrony with the stripping-rollers and usually at about the same rate of speed, and I therefore connect one of the driving-shafts 9 with one of the stripping-rollers 4 by suitable gears 14 of such proportionate pitch diameter as to give the best results, it being evident that these rollers 4 and the conveyers may be driven from separate sources or by any other means which may be available.

The stripping-rollers may be of any well-known construction; but I preferably mount one of them (usually the upper one) under yielding differential pressures, by means of which large and small stalks are fed by and between the rollers with equal facility and ease and the ears of corn stripped therefrom without liability of being drawn into the rollers. In order to accomplish this result, I mount the opposite ends of the upper roller in vertically-movable bearings 16, which are guided in suitable brackets 17, having stop-shoulders 18 and vertically-movable abutments 19 and 20, the abutments 19 consisting of adjusting-screws movable in the upper wall of the bracket, and the abutments 20 consist of plates interposed between the abutments 19 and bearings 16 and normally rest upon the stop-shoulders 18.

Interposed between the abutments 20 and bearings 16 are comparatively light coil-springs 21, which serve to normally hold the upper stripping-roller in its lowest position and counteracts the initial upward movement of said roller as the stalks are being fed therethrough. This spring is sufficient under ordinary conditions when the stalks are light or of small thickness to cause the rollers to strip the ears from the stalks; but it frequently happens that heavy stalks of large diameter are fed promiscuously to the snapping-rollers, and in order that these may readily feed between the rollers and still permit the rollers to bite or snap off the ears of corn therefrom I provide additional springs 22 of greater stiffness or tension than the springs 21 between the abutments 19 and 20, which additional springs are normally held from acting on the springs 21 by the plate or abutment 20, resting on the shoulders 18. When the stalks of greater thickness are fed into the stripping-rollers, the springs 21 are first compressed and then operate to compress the springs 22 through the medium of the plate 20. This adds an increased resistance to the elevation of the upper snapping-roller, and owing to the fact that the ears of corn are very much larger than the stalks the rollers operate to snap off the ears, which then drop onto the inclined wall and thence onto the husking-rollers.

I have thus far described the mechanism for feeding the stalks and for stripping the ears therefrom, and it is evident that the ears drop promiscuously from the stripping-rollers and must be arranged lengthwise preparatory to passing along the husking-rollers, which are usually arranged at substantially right angles to the stripping-rollers and incline downwardly and rearwardly therefrom. These husking-rollers may also be of any desired form or construction adapted to remove the husks from the ears and are arranged in pairs in an inclined plane at substantially right angles to the rollers 4 and receive their rotary motion from a suitable driving-shaft 28, connected to one of the rotating parts of the machine.

Suitable deflector-bars 29 are mounted above and between each pair of husking-rollers for alining the ears with the meeting faces of the rollers and facilitating their feed along the same. It is found, however, that this arrangement of the husking-rollers and deflector-bars is ineffective and unreliable for properly feeding the ears and alining the same lengthwise of the rollers, and I have therefore provided a swinging frame 30, having a sweeping motion lengthwise of and toward and from the rollers in close proximity to their upper faces, which frame is provided with a series of depending teeth or fingers 31 and with a plurality of lengthwise-yielding bars 32, having spring presser-plates 33, alined with the meeting faces of the husking-rollers.

The fingers 31 are mounted upon a cross-bar extending transversely of and above the front upper ends of the husking-rollers in such manner that as the frame 30 is actuated the fingers 31 draw the ears of corn from the inclined chute 6 onto the front ends of the rollers in lengthwise alinement with the meeting faces of said rollers. The downward-rolling movement of the meeting faces of the rollers, together with their inclined position, tends to feed the ears lengthwise of the rollers and at the same time removes the husks from the ears, the husks being discharged beneath the rollers, and the ears of corn are conveyed from the low end of the rollers onto a suitable conveyer. (Not shown.)

The bars 32 are yieldingly suspended from the frame 30 in lengthwise alinement with and slightly above the meeting faces of the husking-rollers by suitable hanger-rods 36 and springs 37, the rods 36 being movable in the frame 30, and serve to limit the movement of the bars toward the husking-rollers, and the springs 37 hold the bars to the limit of their downward movement under yielding pressure. Each of the bars 32 is provided with a series of spring-plates 33, disposed one in advance of the other, their forward ends being secured to the bars and their rear ends being free to move vertically. These spring-plates serve to press the ears of corn against the meeting faces of the rollers under light pressure during the operation of husking and rather retards the feed of the ears along the rollers, so as to insure the more perfect removal of all of the husks before being discharged from the rollers.

It is evident from the foregoing description that the springs 37 hold the bars under a uniform yielding pressure and together with the spring-plates 33 permit the simultaneous feed of ears of various thicknesses along the husking-rollers, at the same time pressing said ears lightly against the meeting faces of said rollers, thereby causing the husks to be more perfectly and completely removed without injuring the corn. The means for producing this peculiar sweeping movement of the frame 30 and its rake-fingers 31 and presser-plates 33 preferably consists of a shaft 38 and eccentrics 39, which are journaled in suitable bearings 40 in the upper front end of the frame 30 in such manner as to impart an eccentric movement, as described, to the frame as the shaft is rotated. The shaft 38 may be driven by any available rotating part of the machine, such as a gear 41, which is connected to and actuated by the shaft which drives one of the stripping-rollers.

The frame 30 is connected to the main frame, as 42, of the machine by suitable links 43, which serve to steady the frame in its rocking movement.

Each of the bars 32 is provided at its forward end with an upturned fender 45, which operates to prevent displacement of the ears of corn and to deflect the same downwardly onto the husking-rollers as they leave the inclined chute 6. This construction of the machine just described permits a more speedy operation of the parts than has heretofore been practicable and renders the stripping and husking of the ears of corn more positive and efficient.

The operation of the device shown in the drawings having been fully described, it is apparent that many of the details may be substituted by substantial equivalents, and I do not limit myself to the exact structure shown and described.

Having thus described my invention, what I claim, and desire to secure by Letters Patent, is—

1. In a corn-husking machine the combination with rollers for removing the ear from the stalk, one roller being movable vertically, of separate vertically-alined springs of unequal tension acting one against the other and operating to force the rollers together.

2. In a corn-husking machine, the combination with rollers for removing the ear from the stalk, movable bearings for one of the rollers, sliding abutments at one side of the movable bearings, light springs between said bearings and the sliding abutments, an adjustable abutment, and additional heavy springs between said abutments.

3. In a corn-husking machine, the combination with rollers for removing the ear from the stalk, movable bearings for one of the rollers, brackets receiving the bearings and provided with stop-shoulders, a sliding abutment normally resting on the stop-shoulder, a comparatively light spring interposed between the bearings and said abutment, a second abutment, and a second comparatively heavy spring interposed between said abutments.

4. In a corn-husking machine, the combination with rollers for removing the ear from the stalk, movable bearings for one of the rollers, brackets receiving the bearings and provided with stop-shoulders, a sliding abutment normally resting on the stop-shoulders, a comparatively light spring interposed between the bearings and said abutment, a second abutment, and a second comparatively heavy spring interposed between the sliding abutments and means for adjusting the tension of a second spring.

5. In a corn-husking machine, the combination with rollers for removing the ear from the stalk, movable bearings for one of the rollers, a supporting-frame having upright brackets receiving the bearings, said brackets provided with stop-shoulders, sliding abutments normally resting on the stop-shoulders, a comparatively light spring interposed between the bearings and said abutments, additional abutments on the brackets above the former abutments, and a second comparatively heavy spring interposed between the abutments, a fixed table on the frame having parallel grooves, endless carriers moving in the grooves and each provided with a series of bars staggered with those of adjacent carriers with their ends riding on the table for feeding the stalks to the rollers, the ends of the bars of one carrier terminating short of the line of travel of the ends of the bars of the adjacent carrier to form spaces between the lines of travel of said ends, and fingers projecting from the table between the grooves and toward the meeting faces of the rollers in alinement with said spaces for the purpose described.

6. The combination with the husking-rollers of a corn-husking machine, of a frame suspended above and movable toward and from and lengthwise of the rollers, parallel bars on the frame, fenders projecting upwardly from the front end of the bars, spring presser-fingers on the frame to force the ears of corn against the rollers, and means to actuate the frame.

7. The combination with the husking-rollers of a corn-husking machine, of a frame suspended above and movable toward and from and lengthwise of the rollers, lengthwise bars yieldingly mounted in the same plane side by side on the frame, spring-fingers on the bars, additional fingers depending from the frame at the upper end of the rollers, and means to actuate the frame.

8. In a corn-husking machine, in combination, a feeding device for the stalks, rollers receiving the stalks and removing the ears of corn therefrom, husking-rollers receiving the ears, a revolving eccentric, a frame between the feeding device and husking-rollers, and having one end mounted on the eccentric, fingers depending from the frame in front of the eccentric, bars yieldingly mounted side by side on the frame, and spring-fingers mounted on the bars for the purpose specified.

In witness whereof I have hereunto set my hand this 14th day of August, 1902.

JOHN H. REIGLE.

Witnesses:
A. GILBERT TREAT,
E. B. MOSHER.